United States Patent [19]

Whyte, Jr. et al.

[11] 3,904,508

[45] Sept. 9, 1975

[54] PRODUCTION OF GASOLINE

[75] Inventors: Thaddeus E. Whyte, Jr., Cherry Hill, N.J.; John J. Wise, Media, Pa.

[73] Assignee: Mobil Oil Corporation, New York, N.Y.

[22] Filed: May 22, 1974

[21] Appl. No.: 472,408

[52] U.S. Cl.............. 208/17; 44/80; 260/666 R
[51] Int. Cl.² ........................................ C10L 1/04
[58] Field of Search.................... 208/17; 44/80

[56] References Cited
UNITED STATES PATENTS

| | | | |
|---|---|---|---|
| 2,263,266 | 11/1941 | Forney | 208/17 |
| 2,694,002 | 11/1954 | Hays | 208/17 |
| 3,582,281 | 6/1971 | Fenske et al. | 208/17 |

*Primary Examiner*—Herbert Levine
*Attorney, Agent, or Firm*—Charles A. Huggett; Michael G. Gilman

[57] ABSTRACT

Conversion of methanol, and/or other lower aliphatic organic compounds containing at least one hetero atom, such as oxygen, sulfur, nitrogen or halogen, to higher hydrocarbons, notably hydrocarbons boiling in the gasoline boiling range, is known. The volatility of this synthetic, high octane gasoline are improved by admixing low octane natural gas liquids therewith, perhaps accompanied by addition to said admixture of n-butane as well.

3 Claims, No Drawings

PRODUCTION OF GASOLINE

This invention relates to the manufacture of gasoline. It more particularly refers to manufacturing synthetic gasoline having both high octane and acceptable volatility characteristics at low cost.

There have recently been filed several patent applications directed to the efficient conversion of lower molecular weight aliphatic organic compounds containing oxygen, nitrogen, halogen or sulfur hetero atoms and mixtures thereof to high octane gasoline by contacting such compounds with a particular class of zeolite catalysts exemplified by ZSM-5, ZSM-11, ZSM-12, ZSM-21, TEA mordenite and other, similarly behaving high silica to alumina ratio, high crystal density, limited pore size zeolites. Contact is at elevated temperatures of about 500° to 850°F at space velocities of about 0.5 to 50 LHSV.

Reference is made to U.S. patent applications Ser. Nos. 387,223; 387,222 and 387,224 all filed on Aug. 9, 1973, all of which are incorporated herein by reference, with respect to these conversion processes. Reference is also made to U.S. Pat. Nos. 3,702,886 and 3,709,979, to West German Offenlagunschrifft No. 2,213,109 and to U.S. patent applications Ser. Nos. 358,192 filed May 7, 1973 now abandoned and 130,442 filed Apr. 11, 1971 now abandoned, all of which are incorporated herein by reference, with respect to exemplary zeolite catalysts.

For ease of understanding, this invention will be described using methanol as a raw material for conversion into synthetic gasoline as aforesaid. It will be understood that this invention is not limited to methanol derived gasoline but rather that this is exemplary of all of the lower aliphatic, hetero atom containing organics that have been reported to be operative in this process, such compounds having up to about 8 carbon atoms in the longest aliphatic hydrocarbon portion and having a sulfur, oxygen, nitrogen or halogen hetero atom attached to said hydrocarbon portion.

Synthetic gasoline is produced by converting methanol or other similarly behaving raw materials in contact with a high silica to alumina ratio crystalline aluminosilicate zeolite having a high crystal density of not substantially lower than 1.6 grams per cubic centimeter and a constraint index, as hereinafter defined, of about 1 to 12, at about 500° to 850°F and a space velocity of about 0.5 to 50 LHSV. The product is predominantly a highly aromatic liquid boiling up to about 400°F having a very desirable clear research octane of about 104. Unfortunately, this liquid hydrocarbon has a high 50% point of about 260° to 280°F and a low 90% point of about 305° to 325°F.

The class of zeolites utilized in this invention has some unusual properties. These zeolites by themselves induce profound transformations of aliphatic hydrocarbons to aromatic hydrocarbons in commercially desirable yields. Although they have unusually low alumina contents, i.e. high silica to alumina ratios, they are very active even when the silica to alumina ratio exceeds 30. The activity is surprising since the alumina in the zeolite framework is believed responsible for catalytic activity. They retain their crystallinity for long periods in spite of the presence of steam at high temperature which induces irreversible collapse of the framework of other zeolites, e.g. of the X and A type. Furthermore, carbonaceous deposits, when formed, may be removed by burning at higher than usual temperatures to restore activity.

An important characteristic of the crystal structure of this class of zeolites is that it provides constrained access to, and egress from, this intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred zeolites useful in this invention possess, in combination: a silica to alumina ratio of at least about 12; and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in cationic form within the channels. Although zeolites with a silica to alumina ratio of at least 12 are useful, it is preferred to use zeolites having higher ratios of at least about 30. Such zeolites, after activation, acquire an intracrystalline sorption capacity for normal hexane which is greater than that for water, i.e. they exhibit "hydrophobic" properties. It is believed that this hydrophobic character is advantageous in the present invention.

The type zeolites useful in this invention freely sorb normal hexane and have a pore dimension greater than about 5 Angstroms. In addition, the structure must provide constrained access to larger molecules. It is sometimes possible to judge from a known crystal structure whether such constrained access exists. For example, if the only pore windows in a crystal are formed by eight membered rings of oxygen atoms, then access to molecules of larger cross-section than normal hexane is excluded and the zeolite is not of the desired type. Windows of 10-membered rings are preferred, although excessive puckering or pore blockage may render these zeolites ineffective. Twelve-membered rings do not generally appear to offer sufficient constraint to produce the advantageous conversions, although structures can be conceived, due to pore blockage or other cause, that may be operative.

Rather than attempt to judge from crystal structure whether or not a zeolite possesses the necessary constrained access, a simple determination of the "constraint index" may be made by passing continuously a mixture of equal weight of normal hexane and 3-methylpentane over a small sample, approximately 1 gram or less, of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000°F for at least 15 minutes. The zeolite is then flushed with helium and the temperature adjusted between 550°F and 950°F to give an overall conversion between 10 and 60%. The mixture of hydrocarbons is passed at 1 liquid hourly space velocity (i.e. 1 volume of hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The constraint index is calculated as follows:

$$\text{Constraint Index} = \frac{\log_{10}(\text{fraction of n-hexane remaining})}{\log_{10}(\text{fraction of 3-methylpentane remaining})}$$

The constraint index approximates the ratio of the cracking rate constants for the two hydrocarbons. Zeolites suitable for use as catalyst for the present invention are those having a constraint index from 1.0 to 12.0, preferably 2.0 to 7.0.

The class of zeolites defined herein is exemplified by ZSM-5, ZSM-11, ZSM-12, ZSM-21, TEA mordenite and other similar materials. Recently issued U.S. Pat. No. 3,702,886 describing and claiming ZSM-5 is incorporated herein by reference.

ZSM-11 is more particularly described in U.S. Pat. No. 3,709,979, the entire contents of which are incorporated herein by reference.

ZSM-12 is more particularly described in West German Offenlagunschrifft No. 2,213,109, the entire contents of which are incorporated herein by reference.

ZSM-21 is more particularly described in U.S. patent application Ser. No. 358,192, filed May 7, 1973, the entire contents of which are incorporated herein by reference.

TEA mordenite is more particularly described in U.S. patent application Ser. No. 130,442, filed Apr. 11, 1971, the entire contents of which are incorporated herein by reference.

The specific zeolites described, when prepared in the presence of organic cations, are catalytically inactive, possibly because the intracrystalline free space is occupied by organic cations from the forming solution. They may be activated by heating in an inert atmosphere at 1000°F for 1 hour, for example, followed by base exchange with ammonium salts followed by calcination at 1000°F in air. The presence of organic cations in the forming solution may not be absolutely essential to the formation of this type zeolite; however, the presence of these cations does appear to favor the formation of this special type of zeolite. More generally, it is desirable to activate this type zeolite by base exchange with ammonium salts followed by calcination in air at about 1000°F for from about 15 minutes to about 24 hours.

Natural zeolites may sometimes be converted to this type zeolite by various activation procedures and other treatments such as base exchange, steaming, alumina extraction and calcination, in combinations. Natural minerals which may be so treated include ferrierite, brewsterite, stillbite, dachiarite, epistilbite, heulandite and clinoptilolite. The preferred crystalline aluminosilicates are ZSM-5, ZSM-11, ZSM-12, ZSM-21, and TEA mordenite, with ZSM-5 particularly preferred.

In a preferred aspect, the zeolites used herein are selected as those having a crystal density, in the dry hydrogen form, of not substantially below about 1.6 grams per cubic centimeter. It has been found that zeolites which satisfy all three of these criteria are most desired. Therefore, the preferred catalysts of this invention utilize zeolites having a constraint index as defined above of about 1 to 12, a silica to alumina ratio of at least about 12 and a dried crystal density of not less than about 1.6 grams per cubic centimeter. The dry density for known structures may be calculated from the number of silicon plus aluminum atoms per 1000 cubic Angstroms, as given, e.g. on page 11 of the article on Zeolite Structure by W. M. Meier. This paper, the entire contents of which are incorporated herein by reference, is included in "Proceedings of the Conference on Molecular Sieves, London, April 1967", published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal. It is possible that the unusual sustained activity and stability of this class of zeolites is associated with its high crystal anionic framework density of not less than about 1.6 grams per cubic centimeter. This high density, of course, must be associated with a relatively small amount of free space within the crystal, which might be expected to result in more stable structures. This free space, however, is important as the locus of catalytic activity.

Natural gas, as it is produced from wells, contains a fair proportion of entrained petroleum liquids. In conventional production, these natural gas liquids are separated from the gas and blended into the crude supply to a refinery. Natural gas liquids have a rather low clear research octane number of about 50 to 65, depending upon the particular source thereof.

It is an object of this invention to economically manufacture a synthetic, or partially synthetic gasoline boiling range hydrocarbon fraction having commercially acceptable octane number and volatility characteristics.

It is another object of this invention to provide novel means of upgrading natural gas liquids.

It is a further object of this invention to provide novel means for converting relatively inexpensive organic compounds to valuable, high octane gasoline having improved volatility characteristics.

Other and additional objects of this invention will become apparent from a consideration of this entire specification including the claims hereof.

In accord with and fulfilling these objects, one aspect of this invention resides in a process comprising contacting a lower aliphatic organic compound having at least one sulfur, oxygen, nitrogen or halogen hetero constituent or mixtures thereof with each other or with hydrocarbon materials, with a high silica to alumina ratio, high crystal density crystalline aluminosilicate zeolite catalyst at about 500° to 850°F and 0.5 to 50 LHSV under such combination of conditions as to convert said lower aliphatic compound to a product comprising a hydrocarbon mixture of high clear research octane number in the gasoline boiling range; and admixing said high octane hydrocarbon mixture with about 15 to 30% by volume, based upon total liquid volume, of natural gas liquids to produce a $C_5^+$ gasoline product having a clear research octane number of at least about 91, and an ASTM 50% point, between about 225° and 250°F. The resulting ASTM 50% point is lower than the 50% point of said organic compound derived gasoline. It is within the scope of this invention to include in the gasoline composition produced hereby sufficient n-butane or other highly volatile material to pressure the composition to about 7 to 11 RVP (Reid Vapor Pressure).

The $C_5^+$ gasoline composition of this invention is essentially a two component mixture of about 65 to 85 volume % synthetic $C_5^+$ gasoline, having an aromatics content of about 50 to 80 weight %, a 50% point of about 220° to 285°F, a 90% point of about 300° to 330°F and a clear research octane of about 95 to 112; and about 15 to 35 volume percent of $C_5^+$ natural gas liquids having a clear research octane of about 50 to 70. This bipartite composition is preferably converted to a tripartite composition by adding about 1 to 5 volume percent, based upon the total gasoline liquid volume, of low molecular weight, highly volatile materials, such as n-butane, isobutane, butenes, etc. It is, of course, within the spirit and scope of this invention to include other gasoline components in a motor fuel, such as FCC gasoline, alkylate, reformate, hydrocrackate, virgin naphtha or any combination of them. It is also within the spirit and scope of this invention to provide the usual gasoline additives, or any of them, as desired. These include deicers, detergents, rust inhibitors, octane appreciators, etc. It is a notable attribute of this invention that while octane appreciators, such as alkyl lead compounds, can be added to the gasoline composition hereof, this is not necessary in order to make an acceptable commercial gasoline. In fact, the clear octane number of the gasoline composition hereof can be varied by varying the proportion of various components, including the proportion of natural gas liquids. Gasoline compositions of clear octane numbers of 89 to 99 having acceptable volatility can be conveniently obtained by blending organic compound derived synthetic gasoline with natural gas liquids as aforesaid.

One particularly important embodiment of this invention is in the synergistic interfacing of gasoline production which is possible. It is well known that natural gas is directly convertible into methanol by known and widely practiced industrial processes. In fact, most of the world's supply of methanol is produced by conversion of natural gas via synthesis gas to methanol. The methanol so produced can be contaminated with more or less dimethyl ether and/or other oxygenated compounds. This entire product is convertible as aforesaid into high octane gasoline into which is admixed butanes and heavier liquids condensed out of the raw natural gas before it was converted to methanol. An on site facility is then quite able to convert raw natural gas, including the natural gas liquids, to high quality gasoline.

The following Examples are illustrative of the production of gasoline by the practice of this invention without being limiting upon the scope thereof.

EXAMPLE 1

Methanol is contacted with ZN ZSM-5 on alumina (35% ZSM-5, 1.1% Zn, silica/alumina = 140), at 700°F and 1.0 LHSV to produce a product, the liquid portion of which is highly aromatic, about 67% by volume. This product is blended with 3% by volume n-butane and 21% by volume natural gas liquids to produce a clear gasoline having the following properties:

Table 1

| | |
|---|---|
| Clear research octane | 91 |
| RVP | 9.0 |
| ASTM Boiling Points (°F) | |
| 10% | 123 |
| 30% | 181 |
| 50% | 247 |
| 90% | 321 |
| Aromatics (Vol. %) | 53 |
| Benzene (Vol. %) | 1 |

EXAMPLE 2

In a similar run using a Zn ZSM-5 zeolite catalyst having a silica to alumina ratio of 68 which otherwise is the same as that set forth in Example 1, the gasoline blend had 69 volume % synthetic gasoline derived from methanol, 3 volume % n-butane and 28 volume % natural gas liquids. The clear gasoline product had the following properties:

Table 2

| | |
|---|---|
| Clear research octane | 91 |
| RVP | 9.0 |
| ASTM Boiling Points (°F) | |
| 10% | 123 |
| 30% | 170 |
| 50% | 229 |
| 90% | 307 |
| Aromatics (Vol. %) | 47 |
| Benzene (Vol. %) | 2 |

What is claimed:

1. A gasoline composition having a clear research octane number of 89 to 99 comprising a mixture of 15 to 30 volume % natural gas liquids having a clear research octane of about 50 to 65 and 70 to 85 volume % of a synthetic substantially hydrocarbon gasoline consisting of at least about 50% aromatics having a clear research octane of up to about 112, and a 90% point of up to about 330°F derived from the conversion of at least one lower aliphatic organic compound having up to about 8 carbon atoms in a longest aliphatic hydrocarbon group and at least one hetero atom selected from the group consisting of sulfur, oxygen, nitrogen and halogen attached thereto in contact with an aluminosilicate zeolite having a silica to alumina ratio at least about 12.

2. A gasoline composition as claimed in claim 1 having up to about 5 volume % n-butane in said blend.

3. A gasoline composition as claimed in claim 1 having a clear research octane number of about 91 consisting essentially of about 20 to 30 volume % natural gas liquids, about 60 to 80 volume % synthetic gasoline and up to about 10 volume % n-butane.

* * * * *